United States Patent [19]

Stapp

[11] Patent Number: 4,597,855

[45] Date of Patent: Jul. 1, 1986

[54] UPGRADING OF RESIDUAL OILS USING A SELENIUM CATALYST WHEREIN SULFUR AND METALLIC IMPURITIES ARE REDUCED

[75] Inventor: Paul R. Stapp, Bartlesville, Okla.

[73] Assignee: Phillips Petroleum Company, Bartlesville, Okla.

[21] Appl. No.: 747,509

[22] Filed: Jun. 21, 1985

[51] Int. Cl.$^4$ .................... C10G 45/04; C10G 69/04
[52] U.S. Cl. .................... 208/61; 208/89; 208/97; 208/213; 208/216 R; 208/251 H; 502/215
[58] Field of Search ............ 208/61, 89, 112, 108, 208/251 H, 97, 57, 58, 213, 216 R; 502/215, 300, 305

[56] References Cited

U.S. PATENT DOCUMENTS

| | | | |
|---|---|---|---|
| 1,890,438 | 12/1932 | Pier | 502/215 |
| 1,922,491 | 8/1933 | Mittasch et al. | 502/215 |
| 1,949,089 | 2/1934 | Strong | 502/215 |
| 1,991,096 | 2/1935 | Jackson | 502/215 |
| 1,998,626 | 4/1935 | Koenig | 502/215 |
| 2,161,066 | 7/1936 | Lalande | 502/215 |
| 3,268,294 | 8/1966 | Roberts et al. | 502/215 |
| 3,751,360 | 8/1973 | Bernstein et al. | 208/61 |
| 3,826,736 | 7/1974 | Kittrell | 208/61 |
| 3,860,510 | 1/1975 | Henke et al. | 208/61 |
| 3,933,731 | 1/1976 | Machi et al. | 260/40 R |
| 4,251,500 | 2/1981 | Morita et al. | 502/215 |
| 4,534,848 | 8/1985 | Sanada et al. | 208/10 |

*Primary Examiner*—Andrew H. Metz
*Assistant Examiner*—Anthony McFarlane
*Attorney, Agent, or Firm*—French and Doescher

[57] ABSTRACT

A hydrocarbon containing feed stream, e.g., a heavy oil or residuum, is contacted under suitable reaction conditions with a free hydrogen containing gas and a selenium compound, preferably selenium dioxide, so as to produce a hydrocarbon stream having an increased API$^{60}$ gravity. Generally the amounts of impurities (sulfur, coke precursors, metals) contained in the feed stream are reduced in this hydrotreating process.

17 Claims, No Drawings

UPGRADING OF RESIDUAL OILS USING A SELENIUM CATALYST WHEREIN SULFUR AND METALLIC IMPURITIES ARE REDUCED

BACKGROUND OF THE INVENTION

This invention relates to an improved process for upgrading hydrocarbon feed streams, especially heavy oils. In another aspect, this invention relates to the use of a new agent for upgrading heavy oils.

It is well known that many liquid hydrocarbons such as heavy crude oils, heavy residua, products from extraction and/or liquefaction of coal and lignite, products from tar sands and shale oil contain sulfur, metals, coke precursors and other impurities. The presence of these impurities makes further processing of heavier fractions difficult since they generally cause the deactivation of catalysts employed in processes such as catalytic hydrogenation and hydrocracking. It is further known that heavy oils are quite viscous due to the high content of high molecular weight carbonaceous materials called heavies. It is frequently necessary to break down a portion of these heavies in a pretreatment operation so as to facilitate the transport of heavy oils through pipelines to refineries.

SUMMARY OF THE INVENTION

It is thus an object of this invention to provide a process for increasing the API gravity of substantially liquid hydrocarbon containing feed streams and thus to improve the flowability and processability of said streams. It is another object of the invention to provide a process for reducing the amount of sulfur impurities in these hydrocarbon containing feed streams. It is a further object of this invention to provide a process for reducing the amount of carbon precursors contained in the hydrocarbon containing feed streams. It is still another object of this invention to provide a process for reducing the amount of metal impurities contained in these hydrocarbon feed streams. It is a still further object of this invention to provide a new agent for hydrotreating hydrocarbon containing feed streams. Other objects and advantages will be apparent from the detailed description and the appended claims.

In accordance with the instant invention, a substantially liquid hydrocarbon containing feed stream is contacted with a free hydrogen containing gas and at least one selenium compound under such conditions as to produce a hydrocarbon containing stream having a higher $API^{60}$ gravity than said feed stream. In one embodiment, a heavy oil feed stream is contacted with a free hydrogen containing gas and selenium dioxide at elevated temperature and pressure conditions. In another embodiment, a heavy oil is contacted with selenium dioxide and a gaseous mixture of hydrogen and hydrogen sulfide at elevated temperature and pressure conditions. In a further embodiment, at least a portion of a heavy oil that has been contacted with a hydrogen containing gas and $SeO_2$ in accordance with this invention is catalytically cracked.

The process of this invention results in an increase in API gravity (thus decrease in density) of the hydrocarbon stream and in a reduced content of heavies (boiling above 1000° F. at about 1 atm). Also, the levels of impurities, particularly sulfur, metals (such as nickel and vanadium) and coke precursors, are reduced. In the process of this invention, metals, coke precursors and other impurities contained in the hydrocarbon containing feed stream form substances that are substantially insoluble in said hydrocarbon containing stream and that are preferably removed from the treated hydrocarbon containing feed stream by any conventional separation method such as filtration, centrifugation or decantation. The increase in API gravity and the at least partial removal of impurities from the hydrocarbon containing feed stream in this manner provides for improved processability of the hydrocarbon containing feed stream in subsequent upgrading processes such as catalytic hydrogenation/hydrocracking, hydrodesulfurization, hydrodenitrogenation, and catalytic cracking.

DETAILED DESCRIPTION OF THE INVENTION

Suitable substantially liquid hydrocarbon containing feed streams that can be treated in the process of this invention include crude oils, petroleum products, heavy petroleum fractions, coal pyrolyzates, products from extraction and/or liquefaction of coal and lignite, products from tar sands, shale oil, products from shale oil, and similar products. Suitable hydrocarbon feed streams include gas oils and cycle oils having a boiling range (at about 1 atm pressure) from about 400° F. to about 1000° F., and residual oils, e.g., having an initial boiling point (at about 1 atm) higher than about 500° F., more particularly higher than 650° F. The present invention is particularly directed to heavy feed streams such as heavy crude oils or heavy topped crudes which are generally regarded as being too heavy to be distilled. These heavy feed streams have a low API gravity and contain the highest concentration of sulfur, metals such as nickel, iron and vanadium, and coke precursors (expressed as Ramsbottom or Contradson carbon residue). Typically the feedstocks employed will consist primarily of hydrocarbons and will have and $API^{60}$ (i.e., API gravity measured at 60° F.) in the range of about 4 to about 30, particularly about 5 to about 20.

Generally these feedstocks contain from about 0.2 to about 10 weight-% sulfur, about 0.1 to about 40 weight-% Ramsbottom carbon residue (as determined by ASTM D524), about 5 to about 1000 ppm (parts per million by weight) vanadium, from about 3 to about 500 ppm nickel, and about 0.1 to about 2.5 weight-% nitrogen. The amount of heavies boiling over 1000° F. (at 1 atm pressure) can range from about 1 weight-% to about 100 weight-%.

The upgrading process of this invention comprises contacting a substantially liquid hydrocarbon containing feedstock as described above with a hydrogen containing gas and a selenium compound under such elevated temperature conditions and for such a period of time as will result in a hydrocarbon containing stream having an increased $API^{60}$ gravity and generally also having reduced levels of sulfur impurities, metal impurities (particularly Ni and V) coke precursors (Ramsbottom carbon) and heavies (boiling above 1000° F.).

Any apparatus which will afford an intimate contact of the hydrocarbon containing feed stream with the free hydrogen containing gas and a selenium compound at elevated temperature conditions can be employed. The process is in no way limited to the use of a particular apparatus. The process can be carried out in a batch process, e.g., in an autoclave which can be heated and pressured and is preferably equipped with internal agitating means or circulating pumping means. Or the process can be employed as a continuous process, e.g., in a tubular reactor through which at least partially mixed streams of hydrocarbon feed, selenium compound and the hydrogen containing gas flow. The tubular reactor is equipped with heating means and can have static mixing means for enhanced treating efficiency. Or the continuous process can be conducted in an autoclave, equipped with heating and mixing means, with one or more inlets for the hydrocarbon feed stream, selenium compound and the free hydrogen containing gas, which can optionally at least partially premixed, and with one or more outlets for the treated product stream, generally located above said inlets. The term hydrocarbon containing feed stream is used herein to refer to both a continuous and a batch process.

Suitable selenium compounds that can be employed in the process of this invention include selenium dioxide, selenous acid ($H_2SO_3$), ammonium and metal selenites (e.g., $KHSeO_3$, $Na_2SeO_3$, $K_2Se_2O_5$), selenium trioxide, selenic acid ($H_2SeO_4$), ammonium and metal selenates (e.g., $NaHSeO_4$, $K_2SeO_4$, $K_2Se_2O_7$), adducts of $H_2SeO_4$ and $SeO_3$ (e.g., $H_2Se_2O_7$, $H_2Se_3O_{10}$, $H_4Se_3O_{11}$), selenium sulfides (e.g., $Se_4S_4$, $Se_2S_6$, $SeS_7$), selenium sulfate ($SeOSO_4$), organo-selenium compounds such as dialkyl or diaryl selenoxides ($R_2SeO$), and the like. These compounds can be added as solids or liquids or as solutions (e.g., as aqueous solutions of selenous acid, selenites, selenic acid or selenates). The preferred selenium compound additive is selenium dioxide, most preferably added as solid $SeO_2$. The weight ratio of the selenium compound (preferably $SeO_2$) to the hydrocarbons contained in the feed stream generally ranges from about 1:10,000 to about 1:10, preferably from about 1:1000 to about 1:100.

In one embodiment, the treating gas is substantially pure hydrogen. Or the treating gas can be a mixture of hydrogen and another gas such as nitrogen, methane, carbon monoxide or carbon dioxide. In another embodiment, a mixture of hydrogen and hydrogen sulfide is used as the treating gas. Generally the volume ratio of $H_2$ to $H_2S$ (measured at 25° C., 1 atm) in said mixture can range from about 1:2 to about 200:1, preferably from about 2:1 to about 10:1.

The upgrading process of this invention can be carried out at any suitable temperature that will afford an increase in API gravity of the hydrocarbon containing feed stream. Generally the reaction temperature ranges from about 250° C. to about 550° C., preferably from about 300° C. to about 450° C., more preferably from about 350° C. to about 450° C. Higher temperatures than 550° C. may improve the removal of sulfur and metal impurities but may have adverse effects such as more coke formation, and may also not be desirable for economic reasons.

Any suitable pressure can be utilized in the upgrading process of this invention. The pressure should be high enough to keep a substantial portion of the hydrocarbon feed in the liquid state. The reaction pressure can range from about atmospheric to an economically practical pressure as high as 10,000 psig. Generally the total gas pressure (i.e., pressure of CO, plus $H_2$ and $H_2S$ if present) ranges from about 100 psig to about 10,000 psig, preferably from about 400 psig to about 5,000 psig.

It is within the scope of this invention to dilute the hydrocarbon feed stream with a suitable, essentially inert solvent such as a high boiling paraffin (e.g., kerosene or light gas oil) before it is contacted with the selenium compound and the hydrogen containing gas. It is also within the scope of this invention to disperse in said feed stream a hydrotreating catalyst, such as alumina, alumino-silicates, aluminum phosphate and silica, preferably promoted with metals or compounds thereof, e.g. alumina-supported molybdenum oxides or nickel oxides, which may have been presulfided. It is also within the scope of this invention to dissolve in said feed stream a decomposable transition metal compound such as molybdenum hexacarbonyl, molybdenum dithiocarbamate, and molybdenum dithiophosphate during the hydrotreating process of this invention, preferably in the presence of said dispersed hydrotreating catalyst.

Any suitable reaction time, i.e., the time of intimate, simultaneous contact of the hydrocarbon containing feed stream, selenium compound and the hydrogen containing treating gas under such conditions as will result in a reduced level of metals and an increase of $API^{60}$ gravity, can be selected. In a continuous process, the flow rates of the hydrocarbon feed stream and of the treating gas are adjusted such as to provide the desired reaction time. The actual reaction time will greatly depend on the selection of an effective, yet safe reaction temperature and on the desired degree of demetallization and $API^{60}$ gravity increase. Generally, the reaction time ranges from about 1 minute to 30 hours, more preferably from about 0.5 to about 10 hours.

In the process of this invention, the added selenium compound and the impurities contained in the hydrocarbon feed stream (primarily coke precursors, vanadium and nickel) are at least partially converted to a "sludge", i.e., a precipitate of metals, generally in association with formed coke, dispersed in the liquid portion of said hydrocarbon containing stream. The separation of this precipitate from the liquid portion of said hydrocarbon containing stream having an increased $API^{60}$ gravity can be carried out by any suitable separation means such as distillation, filtration, centrifugation, or settling and subsequent draining of the liquid phase.

In accordance with a further embodiment, at least a part of the liquid portion of the hydrocarbon containing stream having increased $API^{60}$ gravity is separated into various fractions by distillation, optionally under vacuum conditions. The light fractions, e.g., those boiling up to 400° F. at atmospheric pressure, can be used as automotive or aircraft fuels or as refining feedstocks. At least one of the heavy fractions, e.g., those boiling above 400° F. at atmospheric pressure, is frequently catalytically hydrotreated for further purification such as in hydrodesulfurization and/or hydrodenitrogenation operations employing well known hydrotreating catalysts. Examples of such catalysts are alumina-supported transition metal compounds (e.g., compounds of Mo and Ni), which can be employed in slurry-type or fixed bed operations so as to further reduce the level of sulfur and other impurities in said fraction.

In still another embodiment, the thus catalytically hydrotreated hydrocarbon-containing fraction is catalytically cracked such, e.g. in a fluidized catalytic cracking process employing zeolite or another well known cracking catalyst, so as to convert at least a portion of said fraction to hydrocarbons having lower molecular weight and lower boiling point, (preferably gasoline and diesel fuel). If the hydrocarbon containing stream, which has been treated in accordance with this invention, contains only minor sulfur and other impurities, the hydrotreating operation as described above may be omitted, and at least one fraction of said hydrocarbon containing stream can be fed directly to a catalytic cracker and treated so as to convert at least a portion of said fraction to hydrocarbons of lower molecular weight and lower boiling point (preferably gasoline and diesel fuel).

The following examples are presented to further illustrate this invention without unduly limiting the scope of this invention.

process and product parameters are summarized in Table I.

TABLE I

| Run | Added SeO$_2$ (Wt %) | Reaction Temp. (°C.) | Reaction Press.[1] (psig) | Reaction Time (Hr) | Liquid Product Yield (Wt %) | API$^{60}$ | Wt % Rams C | ppm Ni | ppm V | Vol % Heavies[2] | Sulfur |
|---|---|---|---|---|---|---|---|---|---|---|---|
| Feed | — | — | — | — | — | 6.7 | 11.8 | 135 | 289 | ~57 | 6.1 |
| 1 | 0 | 400 | 1750–1900 | 1 | 91.8 | 15.4 | 10.5 | 86 | 206 | 32 | 4.3 |
| 2 | 0.83 | 400 | 1800–1900 | 1 | 88.0 | 19.8 | 6.8 | 43 | 90 | 19 | 3.0 |
| 3 | 0.83 | 400 | 1650–1750 | 2 | 74.8 | 19.2 | 6.6 | 43 | 89 | 17 | 2.9 |
| 4 | 0.83 | 400 | 1750–1900 | 4 | 77.9 | 21.4 | 6.3 | 31 | 55 | 16 | 2.7 |
| 5 | 0 | 400 | 2500–2700 | 1 | 86.3 | 17.2 | 8.0 | 58 | 126 | 22 | 3.8 |
| 6 | 0.79 | 400 | 2600–3050 | 2 | 83.5 | 19.6 | 7.7[4] | 76 | 165 | 27 | 3.0 |
| 7 | 0.81 | 400 | 2200–2800 | 1 | 82.5 | 21.2 | 6.7[4] | 58 | 123 | 21 | 2.4 |
| 8 | 0.84 | 375 | 1450–1650 | 2 | 92.4 | 15.9 | 8.9 | 79 | 192 | 35 | 3.5 |
| 9 | 0.83 | 375 | 1150–1750 | 4 | 96.0 | 16.7 | 9.1 | 100 | 222 | 40 | 3.2 |
| 10 | 0.81 | 350 | 1100–1800 | 8 | 98.8 | 12.9 | 9.6 | 66 | 93 | 61 | 4.8 |
| 11 | 0.79 | 300 | 1475–1600 | 8 | 96.6 | 11.3 | 11.9 | 146 | 224 | 54 | 5.0 |
| 12 | 0.41 | 400 | 1250–1700 | 2 | 82.9 | 16.3 | 8.6 | 70 | 144 | 32 | 3.7 |
| 13 | 0.17 | 400 | 1900–2000 | 2 | 77.5 | 18.3 | 7.0 | 44 | 82 | 20 | 3.6 |
| 14[3] | 0.81 | 400 | 1850–1900 | 1 | 87.3 | 17.6 | 8.3 | 67 | 148 | 25 | 3.5 |
| 15[3] | 0.81 | 300 | 1600–2650 | 16 | 90.6 | 10.8 | 10.2 | 35 | 66 | 54 | 5.7 |

[1] During the reaction, the pressure usually dropped from the higher value to the lower value of the listed ranges.
[2] Boiling at >1000° F.
[3] A mixture of 80 vol % H$_2$ and 20 vol % H$_2$S was used.
[4] Conradson carbon residue (determined according to ASTM D189)
Note: nitrogen concentrations ranged from 0.5 to 0.8 weight % in runs 1–15.

EXAMPLE I

In this example the experimental procedure for hydrotreating a heavy oil sith selenium dioxide is described. A stirred autoclave of 300 cc capacity was charged with about 120 grams of a Hondo 650+ residuum, which had an API$^{60}$ gravity of about 6.7 and contained 55–59 weight-% of a fraction boiling above 1000° F., about 11.8 weight-% Ramsbottom carbon residue (determined by ASTM D524), about 135 ppm (parts per million by weight) nickel and about 289 ppm vanadium (both determined by plasma emission analysis) about 6.1 weight-% sulfur (determined by X-ray fluorescence spectrometry) and about 0.94 weight-% nitrogen (determined by ASTM D3228). In invention runs, small amounts of selenium dioxide were also charged to the reactor which was purged with hydrogen by repeated pressuring and venting.

The reactor was pressured at room temperature to 1,000–2,000 psig with hydrogen and then heated to the desired reaction temperature. The initial pressure rose during this heating period to the desired reaction pressure. The reactor was allowed to cool to room temperature and slowly vented. The vent gas contained several volume-% H$_2$S. The reactor contents were diluted with some cyclohexane and removed; the reactor was rinsed with cyclohexane, and the entire mixture of reactor contents and diluent (cyclohexane) was filtered. The filtrate was heated under vacuum conditions so as to remove the diluent. The dry filter cake (called solid product) and the diluent-free liquid (oil) product were weighed and analyzed. The solid product comprises coke, metal compounds and selenium compounds.

EXAMPLE II

This example illustrates the effect of the presence of selenium dioxide during the hydrotreatment of the heavy resid on product properties and yields. Pertinent A comparison of runs 1–7 and runs 5–7 shows that hydrotreating of the heavy feed in the presence of selenium dioxide resulted in higher API gravity of the liquid product. Generally, also lower concentrations of impurities (carbon residue, sulfur and metals) and a lower portion of heavies (boiling at >1000° F.) resulted. A comparison of runs 1–4 also shows that generally longer run times in the presence of SeO$_2$ resulted in higher API gravity and lower levels of impurities and heavies.

Furthermore, higher reaction temperatures were generally more effective in increasing the API gravity and in reducing sulfur, metals, Ramsbottom carbon residue and heavies. The reaction temperature should preferably exceed about 350° C. for commercially desirable product properties. Amounts of SeO$_2$ as low as about 0.2 weight-% were sufficient to attain desirably high API gravity and low impurity/heavies levels (see run 13). A mixture of H$_2$ and of H$_2$S (in lieu of H$_2$ alone) was also effective in removing impurities from the oil, in the presence of SeO$_2$. Especially at a low temperature of about 300° C., the presence of H$_2$S treating gas had a particularly beneficial effect on metals removal (compare runs 11 and 15).

Reasonable variations and modifications can be made in this invention without departing from the spirit and scope thereof.

I claim:

1. A process for upgrading a heavy hydrocarbon containing feed stream comprising the step of intimately contacting a substantially liquid hydrocarbon containing feed stream, which comprises from about 0.1 to about 40 weight-% of Ramsbottom carbon residue, from about 10 to about 1000 ppm vanadium and from about 5 to about 500 ppm nickel, with a free hydrogen containing gas and at least one selenium compound selected from the group consisting of selenium dioxide, selenous acid, ammonium selenites, sodium selenites, potassium selenites, selenium trioxide, selenic acid, ammonium selenates, sodium selenates, potassium selenates, adducts of SeO$_3$ and H$_2$SeO$_4$, selenium sulfides, selenium sulfate, dialkyl selenoxides and diaryl selenoxides, under such contacting conditions as will result in a liquid hydrocarbon containing stream having increased API$^{60}$ gravity and reduced levels of Ramsbottom carbon residue, vanadium and nickel, wherein at least a portion of each of the vanadium and nickel contained in said feed stream is converted to a precipitate, which is dispersed in said liquid hydrocarbon containing stream having increased API$^{60}$ gravity and reduced levels of Ramsbottom carbon residue, vanadium and nickel.

2. A process in accordance with claim 1, wherein said selenium compound is selenium dioxide.

3. A process in accordance with claim 1, wherein the substantially liquid hydrocarbon containing feed stream has an API$^{60}$ gravity ranging from about 4 to about 30 and comprises from about 0.3 to about 10 weight-% of sulfur.

4. A process in accordance with claim 2 wherein said free hydrogen containing gas also contains hydrogen sulfide.

5. A process in accordance with claim 2 wherein said contacting conditions comprise a reaction temperature ranging from about 250° C. to about 550° C., a total gas pressure ranging from about 100 psig to about 10,000 psig, and a weight ratio of selenium dioxide to hydrocarbons in said feed stream ranging from about 1:10,000 to about 1:10.

6. A process in accordance with claim 4 wherein the volume ratio (at 25° C., 1 atm) of hydrogen to hydrogen sulfide ranges from about 1:50 to about 200:1, and said contacting conditions comprise a reaction temperature ranging from about 250° C. to about 550° C., a total gas pressure ranging from about 100 psig to about 10,000 psig, and weight ratio of selenium dioxide to hydrocarbons in said feed stream ranging from about 1:10,000 to about 1:10.

7. A process in accordance with claim 5, wherein said contacting conditions comprise a reaction temperature ranging from about 350° C. to about 450° C., a total gas pressure ranging from about 400 psig to about 2,000 psig, and a weight ratio of selenium dioxide to hydrocarbons in said feed stream ranges from about 1:1,000 to about 1:100.

8. A process in accordance with claim 6 wherein the volume ratio (at 25° C., 1 atm) of hydrogen to hydrogen sulfide ranges from about 2:1 to about 10:1 and said contacting conditions comprise a reaction temperature ranging from about 300° C. to about 450° C., a total pressure ranging from about 400 psig to about 5,000 psig, and a weight ratio of selenium dioxide to hydrocarbons in said feed stream ranges from about 1:1,000 to about 1:100.

9. A process in accordance with claim 1 comprising the addition step of separating said hydrocarbon-containing stream having increased API gravity into light and heavy fractions by distillation.

10. A process in accordance with claim 1 comprising the additional step of separating said precipitate from said liquid hydrocarbon stream having increased API$^{60}$ gravity and reduced levels of Ramsbottom carbon residue, vanadium and nickel.

11. A process in accordance with claim 10, wherein said separating step comprises filtration.

12. A process in accordance with claim 10, wherein said separating step comprises settling and subsequent draining.

13. A process in accordance with claim 9, wherein at least one heavy fraction of said distilled hydrocarbon-containing stream having increased API gravity is hydrotreated in the presence of an alumina-supported transition metal compound as catalysts so as to reduce the amount of metallic impurities in said fraction.

14. A process in accordance with claim 10, wherein at least a portion of said hydrocarbon-containing fraction resulting from said separation is catalytically cracked so as to convert at least a portion of said fraction to hydrocarbons having lower molecular weight and lower boiling point.

15. A process in accordance with claim 13, wherein at least a portion of said hydrotreated hydrocarbon-containing stream is catalytically cracked so as to at least partially convert said portion to hydrocarbons having lower molecular weight and lower boiling point.

16. A process in accordance with claim 1, wherein said hydrocarbon-containing feed stream contains at least one dispersed, alumina-supported hydrotreating catalyst.

17. A process in accordance with claim 16, wherein said hydrocarbon-containing feed stream also contains at least one decomposable molybdenum compound.

* * * * *